United States Patent
Morein

(10) Patent No.: US 6,433,788 B1
(45) Date of Patent: Aug. 13, 2002

(54) DUAL FRAGMENT-CACHE PIXEL PROCESSING CIRCUIT AND METHOD THEREFORE

(75) Inventor: Steven Morein, Cambridge, MA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/364,442

(22) Filed: Jul. 30, 1999

(51) Int. Cl.$^7$ ............................................... G06F 15/16

(52) U.S. Cl. ...................... 345/557; 345/614

(58) Field of Search ................ 345/557, 614, 345/531, 536, 537, 539, 564; 711/119, 135

(56) References Cited

U.S. PATENT DOCUMENTS

| | | | | |
|---|---|---|---|---|
| 5,909,225 A | * | 6/1999 | Schinnerer et al. | 345/545 |
| 5,990,904 A | * | 11/1999 | Griffin | 345/631 |
| 6,115,049 A | * | 9/2000 | Winner et al. | 345/422 |
| 6,204,856 B1 | * | 3/2001 | Wood et al. | 345/419 |

* cited by examiner

Primary Examiner—Ulka J. Chauhan
(74) Attorney, Agent, or Firm—Vedder, Price, Kaufman & Kammholz

(57) ABSTRACT

A dual-cache pixel processing circuit that allows one cache to be flushed while the other receives subsequent pixel fragments is presented. The system includes a first fragment cache and a first set of state registers where the first set of state registers stores state variables for drawing operations corresponding to fragments stored in the first fragment cache. The system also includes a second fragment cache and a second set of state registers where the second set of state registers stores state variables for drawing operations corresponding to fragments stored in the second fragment cache. The system further includes a render backend block that is operably coupled to the first and second fragment caches and to a frame buffer that stores current pixel information for a plurality of pixels in a display frame. The render backend block combines fragments received from the first and second caches with portions of the current pixel information in the frame buffer to produce revised pixel information that is stored back in the frame buffer. The combination operations performed by the render backend block utilize the state information stored in one of the first and second sets of state registers based on from which fragment cache the fragment being combined originated. A control block that is operably coupled to the first and second fragment caches and the first and second sets of state registers initially routes received fragments to the first fragment cache. When a state change occurs, the control block alters the flow of fragments such that subsequent fragments are routed to the second fragment cache while the first fragment cache is flushed. Flushing the first fragment cache includes providing all of the pixel fragments included in the first fragment cache to the render backend block along with the old state variables that are stored in the first set of state registers.

22 Claims, 4 Drawing Sheets

DUAL FRAGMENT-CACHE PIXEL PROCESSING CIRCUIT AND METHOD THEREFORE

FIELD OF THE INVENTION

The invention relates generally to video graphics processing and more particularly to a dual cache pixel processing circuit and method therefore.

BACKGROUND OF THE INVENTION

Computer displays and other high resolution display devices such as high definition television (HDTVs), projectors, printers, plotters, and the like, present an image to the viewer as an array of individual picture elements, or pixels. The individual pixels are each given a specific color that corresponds to the color of the image at the location at the particular pixel. The pixels are closely spaced, and the viewer's visual system performs a filtering of the individual pixel colors to form a composite image. If the partitioning of the image into the individual pixel elements is performed properly and the pixels are close enough together, the viewer perceives the displayed array of pixels as a virtually continuous image.

Images are drawn to the display through the use of graphics primitives, which are often triangle primitives. These primitives are processed by the graphics processing system to produce individual pixel fragments. A pixel fragment is a fragment of the video graphics primitive. Each fragment determines a particular color and Z value corresponding to the primitive as applied to a particular pixel location on the display. Pixel fragments are typically processed by a render backend block. The render backend block determines the pixel to which the fragment corresponds and fetches current pixel information for that pixel location from a frame buffer that stores the pixel data for each pixel in the frame. The render backend block then performs blending operations that combine the received fragments with the currently stored information for the corresponding pixel locations in the frame buffer and write the new pixel information resulting from the blending operations back to the frame buffer.

Multiple graphics primitives may be processed in quick succession where each of the multiple graphics primitives produces fragments that correspond to the same pixel location. As such, rather than forcing the render backend block to handle multiple fragments corresponding to the same pixel location, a cache structure can be used to buffer the received fragments prior to providing them to the render backend block. Including a cache structure in the data path for the pixel fragments enables multiple fragments that apply to the same pixel location to be combined prior to presentation to the render backend block. Offloading some of the blending operations from the render backend block can improve overall system performance.

When performing drawing operations, the render backend block typically relies on certain state parameters. Examples include alpha blending and a parameter that orients fragments spatially with respect to the Z access. When a state change occurs in the system such that some of the state parameters are altered, the cache can cause problems in the flow of received fragments. The pixel fragments stored in the cache prior to the state change are fragments that should be blended by the render backend block using the old state parameters, whereas fragments subsequently received rely on the new state parameters. As such, the entire cache must be flushed and the fragments provided to the render backend block with the old state parameters before additional fragments can be received. Halting the incoming stream of fragments can adversely affect the video graphics processing operations, and defeats some of the improved performance obtained by including a cache in the fragment data path.

Therefore, a need exists for a method and apparatus that allows for caching of pixel fragments while ensuring that state changes do not adversely affect video graphics processing performance.

DETAILED DESCRIPTION OF A PREFERRED EMBODIMENT OF THE INVENTION

The present invention provides for a dual-cache pixel processing circuit that allows one cache to be flushed while the other receives subsequent pixel fragments. The system includes a first fragment cache and a first set of state registers where the first set of state registers stores state variables for drawing operations corresponding to fragments stored in the first fragment cache. The system also includes a second fragment cache and a second set of state registers where the second set of state registers stores state variables for drawing operations corresponding to fragments stored in the second fragment cache. The system further includes a render backend block that is operably coupled to the first and second fragment caches and to a frame buffer that stores current pixel information for a plurality of pixels in a display frame. The render backend block combines fragments received from the first and second caches with portions of the current pixel information in the frame buffer to produce revised pixel information that is stored back in the frame buffer. The combination operations performed by the render backend block utilize the state information stored in one of the first and second sets of state registers based on from which fragment cache the fragment being combined originated. A control block that is operably coupled to the first and second fragment caches and the first and second sets of state registers initially routes received fragments to the first fragment cache. When a state change occurs, the control block alters the flow of fragments such that subsequent fragments are routed to the second fragment cache while the first fragment cache is flushed. Flushing the first fragment cache includes providing all of the pixel fragments included in the first fragment cache to the render backend block along with the old state variables that are stored in the first set of state registers.

By providing a second, or backup fragment cache, the system can continue to cache received pixel fragments when state changes occur. This prevents a bottleneck in the fragment data stream that would normally result when the cache structure storing received fragments needs to be flushed because a state change occurs. The dual-cache and dual-register system also ensures that fragments stored in each of the caches are processed by the render backend block utilizing the proper set of state variables.

Figure 1:
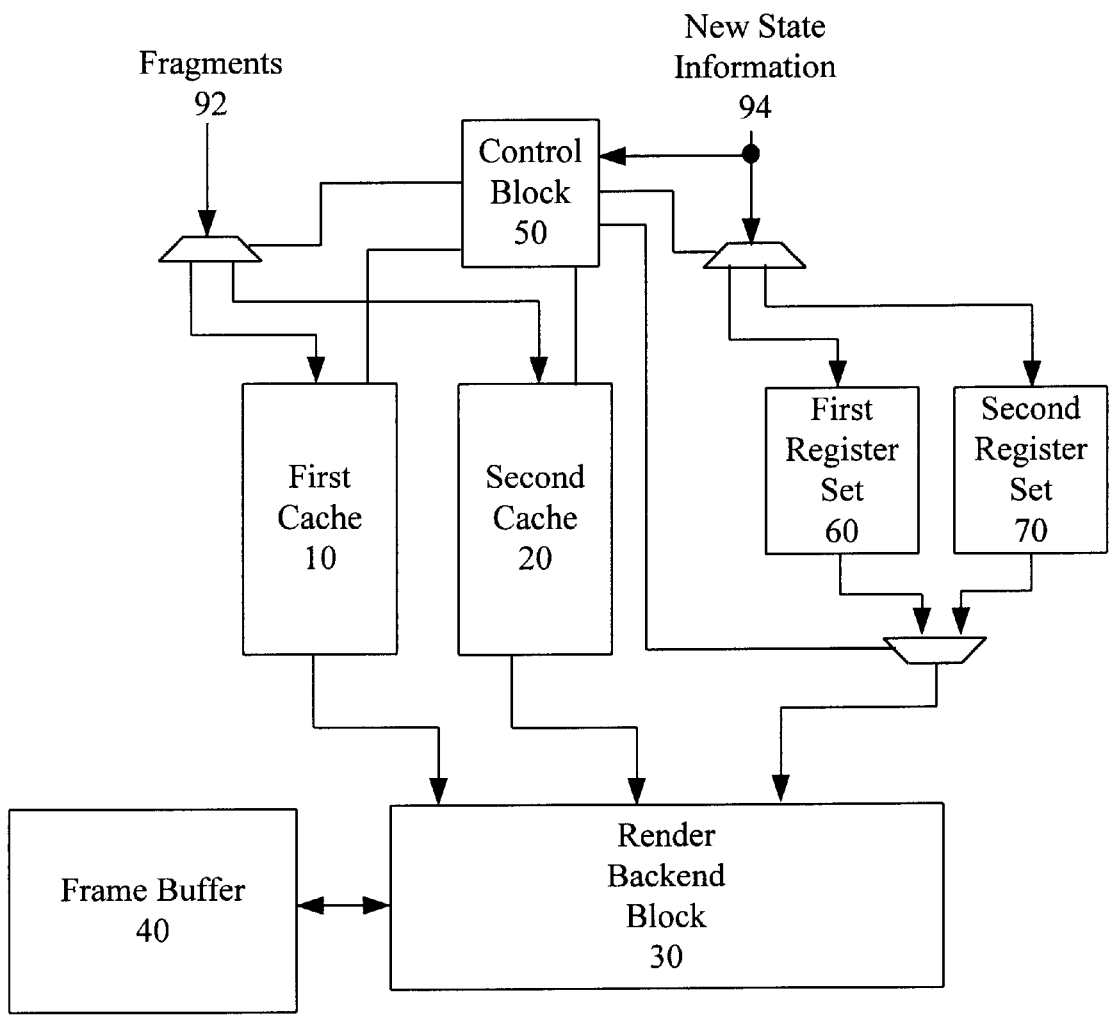
FIG. 1 illustrates a block diagram of a dual fragment cache pixel processing circuit in accordance with the present invention.

The invention can be better understood with reference to FIGS. 1–6. FIG. 1 illustrates a block diagram of a dual fragment cache pixel processing circuit 100. The circuit 100 includes first and second fragment caches 10 and 20, first and second register sets 60 and 70, a control block 50, a render backend block 30, and a frame buffer 40. A fragment stream 92 is received by the circuit 100, where the fragments 92 are to be combined with pixel information currently stored in the frame buffer 40 by the render backend block 30 for generation of video graphics images. The control block 50 initially routes received fragments to the first fragment cache 10. Thus, in the initial state, the first cache 10 operates as the current, or active fragment cache that is receiving the fragment stream 92. The first cache 10 stores these fragments based on a mapping scheme that will be discussed in more detail with respect to FIGS. 2–4.

In some instances, the first cache 10 will have to displace a currently stored fragment in order to store a newly received fragment. In such instances, the displaced fragment will be provided to the render backend block 30 along with the state information stored in the first register set 60, which is the current register set storing the current state information to be used for blending operations performed by the render backend block 30. In other instances, if a fragment is received corresponding to a pixel that already has a cache fragment stored in the first cache 10, a blending operation, which will be described in more detail with respect to FIGS. 2–4, will combine the two pixel fragments to result in a single fragment stored in the first cache 10.

When new state information 94 is received, the control block 50 changes the routing of incoming fragments 92 such that they are provided to the second cache 20, which is operating as a backup, or reserve cache when the first cache 10 is the current, or active cache. The new state information 94 is stored in the second register set 70, which operates as a backup, or reserve register set when the first register set 60 is the current, or active register set. Once the fragments 92 being received are routed to the second cache 20, the first cache 10 is flushed. Flushing the first cache 10 involves providing all of the fragment data stored in the first cache 10 to the render backend block 30 for processing. The fragment data stored in the first cache 10 is provided along with the old state information still stored in the first register set 60.

Once the state change has been completed, the second cache 20 operates as the current, or active cache as it receives the fragments 92. Any displaced fragments or other cached fragments stored in the second cache 20 that must be provided to the render backend block 30 are provided to the render backend block 30 along with the new state information 94 that has been stored in the second register set 70, which has now become the current, or active register set. Note that once the first cache 10 has been flushed in response to the state change, it operates as a backup, or reserve cache with respect to the now currently active second cache 20. Thus, if another state change occurs, the fragment data is routed to the first cache 10 while the second cache 20 is flushed.

It should be apparent to one of ordinary skill in the art that more than two caches could be included in such a system such that multiple state changes could be accommodated in short succession. Providing more than one cache in a pixel processing circuit such as that shown in FIG. 1 enables state changes to be handled in a manner that does not prevent continuous receipt of fragment data, thus insuring that system performance levels are maintained. At the same time, including a corresponding number of register sets enables each cache to have a corresponding set of state information available for performing the drawing operations for the fragments stored within each cache. Thus, when a cache is flushed, or emptied, and the fragment data is provided to the render backend block 30 for processing, the proper state information for performing the drawing operations by the render backend block 30 is available.

Figure 2:
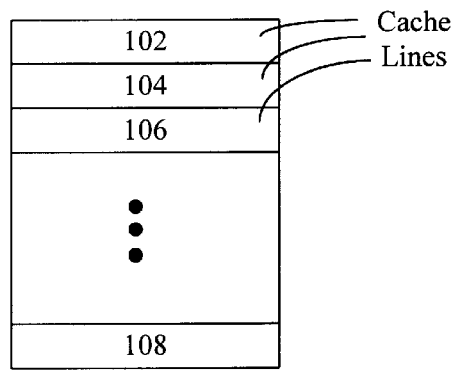
FIG. 2 illustrates a block diagram of a cache included in the circuit of FIG. 1.

FIG. 2 illustrates a block diagram of a fragment cache 10. The fragment cache 10 is preferably a direct-mapped cache that includes a plurality of cache lines 102–108. Each fragment received by the pixel processing circuit includes a set of pixel coordinate data that indicates to which pixel in the display frame the particular fragment is to be applied. The coordinate data can be used to address the cache 10 such that the storage of fragments in the various cache lines 102–108 is controlled by the coordinate data.

In an example system that includes a display frame that is 2,048 pixels wide and 2,048 pixels high, each of the dimensions, X and Y, can be described using 11 bits. In such a system, a cache line for a particular fragment could be determined based on a portion of the bits determining the X coordinate and a portion of the bits determining the Y coordinate. Thus, in one example if the bits for the X coordinate are $X_{10}$–$X_0$, bits $X_3$ and $X_2$ may be used in determining the appropriate cache line for this fragment. These X coordinate bits would most likely be used in conjunction with a portion of the Y coordinate bits ($Y_{10}$–$Y_0$). Thus, each line within the cache may be addressed by a five bit address that is made up of X and Y coordinate bits such as ($X_3$–$X_2$, $Y_2$–$Y_0$).

Figure 3:
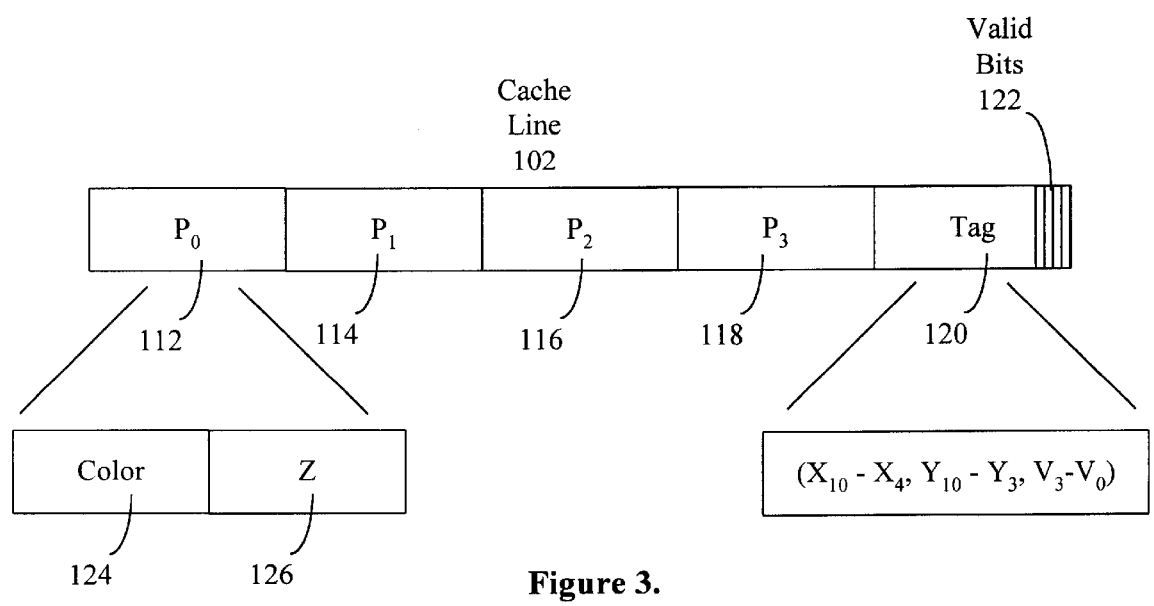
FIG. 3 illustrates a block diagram of a cache line entry in accordance with the present invention.

FIG. 3 illustrates a more detailed view of the cache line 102 as it is structure in one embodiment. Note that the cache line 102 is capable of storing a plurality of pixel fragments 112–118. Each of the pixel fragments 112–118 is shown to include a color value 124 and a Z value 126. The Z value 126 determines the spatial depth with respect to the viewer or the display of the particular pixel fragment. Within each cache line, the particular location for a fragment within the plurality of fragments included in the line is determined based on another portion of the set of coordinate data for the fragment. In the embodiment illustrated in FIG. 3, the lowest two X coordinate bits are used to index between pixel fragments within the cache line 102. Thus, pixel fragment 112, $P_0$, corresponds to pixel fragments that have lowest two X coordinates, $X_1$ and $X_0$, that are both equal to zero. Similarly, pixel fragment location $P_3$ 118 corresponds to fragments whose lowest two X coordinate bits are both equal to one one.

Using a direct mapped cache causes multiple fragments to be mapped to the same cache locations. Thus, fragments having the same lowest level X and Y coordinate bit values will map to the same pixel fragment locations within the cache. In order to be able to determine the exact pixel location for a fragment stored in a cache, a set of tag bits 120 is included in the cache line 102. The tag 120 of FIG. 3 is shown to store the upper level X and Y coordinate bits ($X_{10}$–$X_4$ and $Y_{10}$–$Y_3$).

Also included in the tag portion 120 are a number of valid bits ($V_3$–$V_0$) 122. These valid bits 122 indicate whether or not there is a pixel fragment stored in each of the pixel fragment locations within the cache line 102. Thus, if there are no pixel fragments currently stored in the cache line 102, all of the valid bits 122 will be cleared. If there are pixel fragments stored in locations $P_3$ 118 and $P_1$ 114, valid bits $V_3$ and $V_1$ will be set, whereas valid bit $V_2$ and $V_0$ will be clear.

When a pixel fragment is received by the cache 10, the appropriate cache line is determined based on a portion of the pixel coordinate data for the fragment. Once the particular cache line has been determined, the valid bits for that cache line are examined to determine whether or not there are pixel fragments currently stored in that cache line. If the valid bits are all clear, indicating that the cache line is empty, the pixel fragment can simply be stored in the appropriate fragment location within the cache line as determined by another portion of the pixel coordinate data. The tag can then be updated to store the upper level pixel coordinate data for the fragment, and the appropriate valid bit set.

If, when a fragment is received, the cache line to which that fragment corresponds includes valid bits that are set, the tag must be examined to determine whether or not the received pixel fragment has upper level coordinates that match the tag. If the pixel coordinates of the received fragment do not match the tag currently stored in the cache line, the line is flushed and the newly received fragment is stored in the cache line along with its corresponding tag and the corresponding valid bit is also set. Flushing a line from the cache involves providing each of the pixel fragments that may be stored within the line to the render backend block along with the appropriate set of state information for blending within the render backend block with currently stored pixel information. When a number of fragments are contained within the cache line 102 when it is flushed, efficiencies are achieved within the render backend block as up to four (in the example illustrated) pixel fragments corresponding to neighboring pixels within the display frame can be processed together. This can occur more efficiently than processing four pixel fragments corresponding to pixels at widely dispersed locations within the display frame, as the memory operations required to fetch the current pixel information from the buffer often involves block transfers that fetch multiple sets of pixel information for multiple neighboring pixels.

If when a newly received pixel fragment is received, valid bits are set and the coordinate data in the current tag matches the coordinate data for the newly received fragment, the particular valid bits must be examined to determine whether or not a pixel fragment corresponding to the exact pixel location for the newly received fragment is already present within the cache line. If the valid bits indicate that there is not a pixel fragment stored in the cache line corresponding to the exact pixel location to which the newly received fragment maps, the newly received fragment can simply be stored in the appropriate location and the corresponding valid bit set to indicate its presence. If the valid bit for the particular location is already set when the newly received fragment is received, a blending operation will be performed between the currently stored fragment and the newly received fragment.

The blending performed between the two fragments may involve a comparison of the Z values for each fragment being blended to determine which of the fragments lies in front of the other fragment. The front-most fragment is then stored in the cache line, and the rear-most fragment is discarded. If the Z values happen to be equal, or in close proximity, a blending operation between the two colors may be performed and the blended color stored in the cache line along with the Z value for the pixel fragments.

Figure 4:
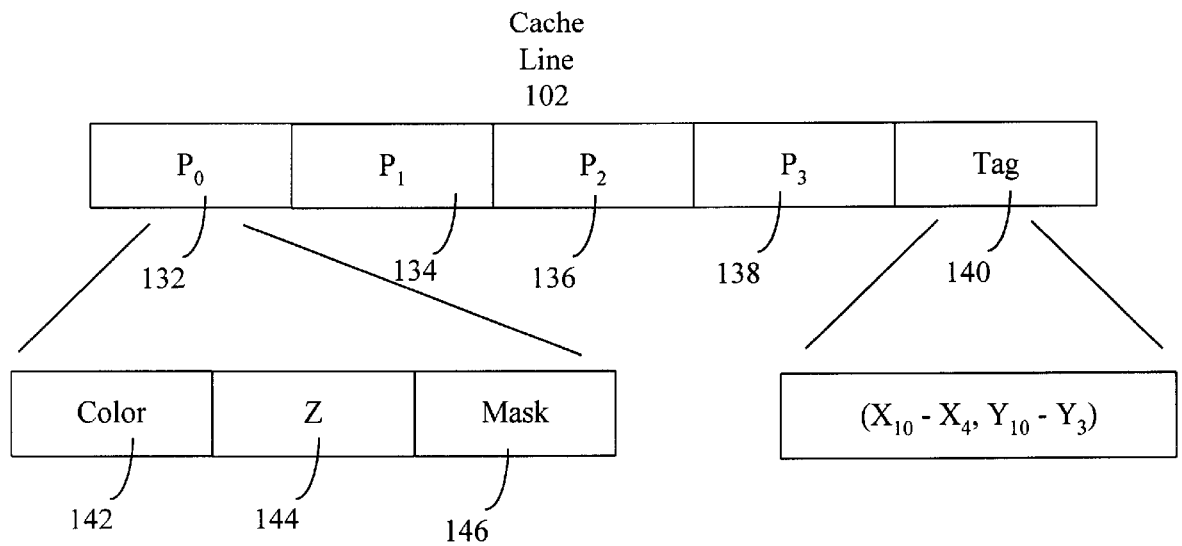
FIG. 4 illustrates a block diagram of an alternate cache line entry in accordance with the present invention.

FIG. 4 illustrates a cache line 102 that may be used in a pixel processing system that employs pixel oversampling. In many video graphic systems, graphics images for display are oversampled such that a more-detailed version of the image then is actually displayed is maintained within the video graphics processing system. Such oversampling also avoids aliasing in reconstructed graphical images. Oversampling techniques are well known in the art. In an oversampling system, multiple samples of each pixel are stored. Although each pixel is rendered using only a single color value, each of the samples for that particular pixel are used in generating the final color. In effect, a much more detailed, higher resolution version of the image is stored within the computer and this version is used to generate each of the colors for the pixels displayed on the screen.

In an example oversampling system that generates eight samples per pixel, each of the eight samples will include a color value and a Z value. Fragments generated from graphics primitives, however will generally be of a uniform color and Z value. Thus, a fragment in an oversampled system will include a color value, a Z value, and a mask that indicates coverage of the pixel by the fragment. Thus, if the fragment only overlaps a portion of the pixel, the mask will indicate which samples within the pixel are covered by the fragment and which samples are not covered.

FIG. 4 illustrates a cache line 102 that may be used in an oversampling system. The cache line 102 includes four pixel fragment locations 132–138 and a tag value 140. As is illustrated with respect to pixel fragment $P_0$ 132, each pixel fragment stored within the cache line 102 will include a color value 142, a Z value 144, and a mask value 146 that indicates pixel coverage. Because the mask 146 indicates to which samples the color value 142 and the Z value 144 apply, the mask can be used as the equivalent of the valid bit which was included within the tag of the cache line illustrated in FIG. 3. By simply combining all of the bits within the mask 146 through an OR operation, it can be determined whether or not there are any valid samples stored within a particular pixel fragment location within the cache line.

As before, the cache line 102 is selected from the plurality of cache lines stored in the cache through a portion of the set of pixel coordinate data corresponding to the particular pixel fragment. Once the cache line has been selected, indexing between the various pixel fragment locations within the cache line is accomplished using another portion of the set of pixel coordinate values for the fragment. The remaining coordinates for the particular pixel fragment are used to generate the tag value 140 stored in the cache line 102.

When an oversampled pixel fragment is received and is to be stored within a cache line in the cache, the cache line is first determined and the masks within the cache line are examined to determine if any pixel fragments are currently stored within the cache line. This is equivalent to examining the valid bits included in the tag of the cache line of FIG. 3. If there are no cached pixel fragments currently stored in the cache line 102, the newly received fragment (color, Z, and mask) is simply stored in the cache line at the appropriate fragment location and the tag value is updated.

If the examination of the mask values within the cache line 102 reveal that there are pixel fragments currently stored within the cache line 102, the tag is examined to determine whether or not there is a match between the coordinates of the currently stored cached pixel fragments and the coordinates of the newly received pixel fragment. If there is not a match, the cache line 102 is flushed as described with respect to FIG. 3, the newly received pixel fragment is stored in the cache line, and the tag 140 is updated.

If there is a match between the coordinates of the newly received pixel fragment and the tag 140 stored in the cache line 102, the particular fragment location corresponding to the newly received fragment is examined to determine whether or not there is a pixel fragment stored within that particular fragment location. If there is, a bit-wise AND is performed on the mask of the newly received pixel fragment and the mask of the currently cached pixel fragment stored in the cache line 102. If the result of the bit-wise AND is nonzero, the cache line must be flushed and the newly received pixel fragment is stored in the cache line 102.

If the result of the bit-wise AND operation between the mask is zero, the color and Z values for the newly received fragment and the cache fragment are compared. If the color and Z values are the same, a new mask is produced by combining the individual masks of the two fragments. If the Z values are equal but the colors are not, the Z value is maintained in the fragment location in the cache and the color value is a blended version of the colors of the two fragments. The mask is then modified to reflect the combination of the two fragments and is equal to a bit wise OR of the two individual masks.

If the Z values are not equal, but are very close, such that the absolute value of the difference between the two Z values is within some error threshold, a blending operation as described in the previous paragraph may be performed. If the Z values are not within the error tolerance, the fragment entry currently stored in the cache is flushed and the newly received pixel fragment is stored in the cache line. The error threshold for comparison of the Z values between the two fragments is preferably configurable based on the particular implementation. In one embodiment, the error threshold may be set to an error threshold within a range between two and four.

It should be noted that the "setting" a bit within the cache line or other portion of the system in order to indicate the present state of the cache line or other system component is not meant to require "setting" to imply storing a high, or "1" value for the bit. In some embodiments, "setting" a bit may indicate forcing the bit to a value of zero. "Clearing" merely means forcing the logic state of a bit to the opposite value it would have it the bit were "set".

Figure 5:
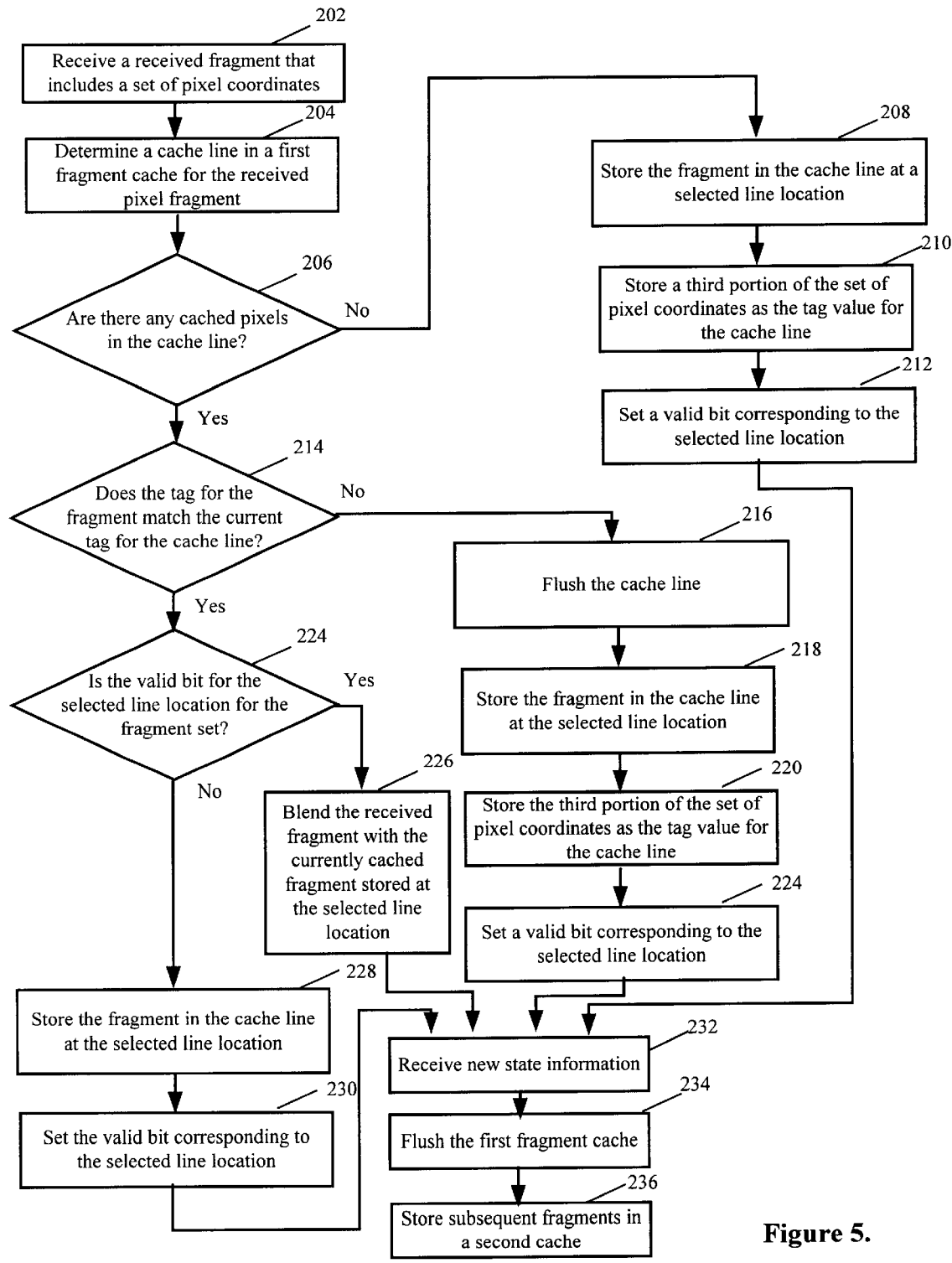
FIG. 5 illustrates a flow diagram of a method for buffering fragments in a video graphics system in accordance with the present invention.

FIG. 5 illustrates a flow diagram of a method for buffering fragments in a video graphics system. The video graphics system preferably includes two or more caches as was illustrated in FIG. 1. The dual-cache structure allows for continuous buffering of received fragments while maintaining the proper state information for all received fragments. The method begins at step 202 where a received pixel fragment is received that includes a set of pixel coordinates describing a pixel to which the received pixel fragment corresponds. The received pixel fragment may be a pixel fragment that includes a single color and a single Z value, or may be an oversampled pixel fragment that includes a single color value, a single Z value, and a mask that indicates coverage of the pixel by the fragment.

At step 204, a cache line in a first fragment cache is determined for the received pixel fragment based on a first portion of the set of pixel coordinates. Preferably the portion of the set of pixel coordinates is as was described with respect to FIGS. 3 and 4 such that in a direct mapped cache the certain coordinate bits of the set of pixel coordinates will be used to step between lines within the cache.

At step 206, it is determined if there are any cached pixel fragments currently stored in the cache line that corresponds to the received pixel fragment. This is preferably determined by examining valid bits included in a tag portion of the cache line, or by examining mask values at each fragment location in the case of an oversampled system.

If there are not any cached pixels currently stored in the cache line, the method proceeds to step 208 where the received pixel fragment is stored in the cache line at a selected line location determined from a second portion of the set of pixel coordinates. Preferably, the second portion of the set of pixel coordinates includes lower level bits within the set of coordinates such as the $X_1$ and $X_0$ values used in the example of FIG. 3.

At step 210, a third portion of the set of pixel coordinates is stored in a tag corresponding to the cache line for the pixel fragment. The tag indicates the remaining portion of the set of pixel coordinates that have not been used to index through the cache. At step 212, a valid bit corresponding to the selected line location within the cache line is set to indicate that a pixel fragment is stored at that selected line location.

If it is determined at step 206 that there are cached pixel fragments currently stored in the cache line, the method proceeds to step 214. At step 214 the tag stored for the cache line is compared with the third portion of the set of pixel coordinates (the tag value) of the received pixel fragment. If the tags do not match, the method proceeds to step 216. At step 216 the cache line is flushed such that the one or more cached pixel fragments currently stored in the cache line are provided to the render backend block along with current state information for blending operations. Once the cache line has been flushed at step 216, the method proceeds to steps 218–222, which store the pixel fragment and update the tag value and valid bit indications.

If it is determined at step 214 that the tags do in fact match, the method proceeds to step 224 where the valid bit for the selected line location corresponding to the received pixel fragment is examined to determine if there is a cache pixel fragment at the line location in which the received pixel fragment is to be stored. If there is a currently cached fragment at that location, a blending operation may be performed at step 226. The blending operation may include comparing the Z values of the two fragments to determine which is the front-most fragment. The blending operation may also include blending the colors when the Z values are the same, merging masks in and oversampled system, etc. These blending operations were described in more detail earlier in the specification.

If the valid bit for the selected line location is not set, indicating that there is not a cached pixel fragment currently stored at that line location, the method proceeds to step 228 where the received pixel fragment is stored at the line location. Because the tag value already reflects the third portion of the set of pixel coordinates, it does not need to be updated, and all that remains is to set the valid bit corresponding to the line location which now contains the newly received fragment at step 230.

At step 232, new state variables that replace old state variables are received, where these state variables control the drawing operations using received fragments. The new state variables received at step 232 indicate a state change. When a state change occurs, the cache that stores pixel fragments corresponding to the old state variables must be flushed such that the drawing operations involving the pixel fragments within that cache are performed utilizing the old state variables. Newly received pixel fragments are therefore routed to a second cache, and the new state variables are stored such that they can be used with the newly received fragments stored in the second cache.

At step 234, the first fragment cache is flushed such that the drawing operations involving pixel fragments cached in the first fragment cache are performed using the old state variables. At step 236, subsequently received pixel fragments are stored in the second fragment cache.

Figure 6:
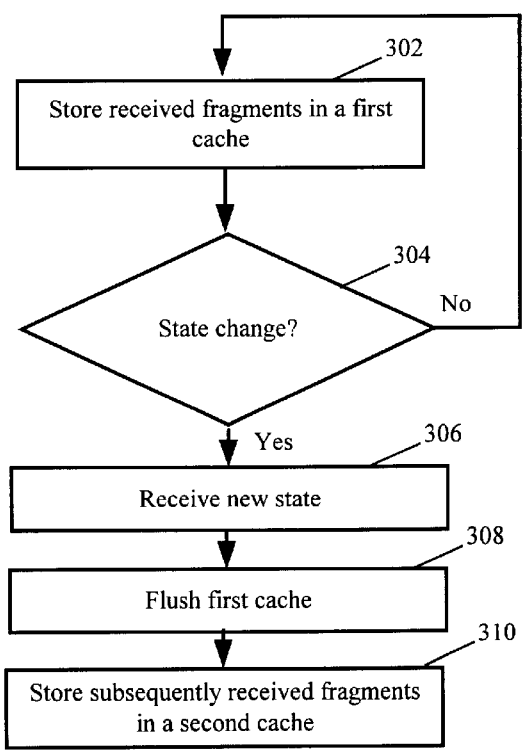
FIG. 6 illustrates a flow diagram of a method for combining received pixel fragments with stored pixel information in accordance with the present invention.

FIG. 6 illustrates a flow diagram of a method for combining received pixel fragments with stored pixel information. The method begins at step 302 where received pixel fragments are stored in a first fragment cache. When storage of a received pixel fragment requires a currently cached pixel fragment to be flushed from the first fragment cache, the cache pixel fragment is provided along with a first set of state values to a render backend block for processing.

When a state change is detected at step 304, the new state values are received at step 306 and preferably stored in a set of state registers that correspond to a second fragment cache. At step 308, the first fragment cache is flushed such that pixel fragments in the first fragment cache are provided to the render backend block along with the first set of state values.

Once the transition between the first and second fragment cache has occurred, subsequently received pixel fragments are stored in the second fragment cache. When storage of a subsequently received pixel fragment requires a subsequently cached pixel fragment to be flushed from the second fragment cache, the subsequently cached pixel fragment will be provided along with the new state values to the render backend block for processing.

Providing two or more fragment caches in a pixel processing system provides a means to insure that data flow within the system is maintained. Thus, when state changes occur and one of the caches needs to be flushed such that the drawing operations are performed using the correct set of state variables, the other cache can be used to receive subsequent pixel fragments. Likewise, when the second cache must be flushed due to a subsequent state change, the first cache can be employed to receive future pixel fragments while the second cache is being flushed.

It should be understood that the implementation of other variations and modifications of the invention in its various aspects should be apparent to those of ordinary skill in the art, and that they invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A dual fragment cache pixel processing circuit, comprising:
   a first fragment cache;
   a first set of state registers, wherein the first set of state registers stores state variables for drawing operations corresponding to fragments stored in the first fragment cache;
   a second fragment cache;
   a second set of state registers, wherein the second set of state registers stores state variables for drawing operations corresponding to fragments stored in the second fragment cache;
   a control block operably coupled to the first and second fragment caches and the first and second sets of state registers, wherein the control block selects one of the first and second fragment caches as a current fragment cache and selects a corresponding one of the first and second sets of state registers as a current set of state registers, wherein whichever of the first and second fragment caches is not the current fragment cache is a backup fragment cache and whichever of the first and second sets of state registers is not the current set of state registers is a backup set of state registers, wherein the current fragment cache caches receives pixel fragments for processing, wherein when a state change is detected by the control block, the control block exchanges designation of the current fragment cache with the backup fragment cache and exchanges designation of the current set of state registers with the backup set of state registers, wherein the control block flushes newly designated backup fragment caches in preparation for future state changes;
   a frame buffer that stores current pixel information for a plurality of pixels in a frame; and
   a render backend block operably coupled to the control block and the frame buffer wherein the render backend block combines fragments received from the control block with portions of the current pixel information retrieved from the frame buffer to produce revised pixel information that is stored in the frame buffer, wherein the render backend block combines the fragments with the current pixel information based on corresponding state variables for the fragments.

2. The circuit of claim 1, wherein each fragment includes a Z value, a color value, and a set of coordinates that identify a pixel in the plurality of pixels in the frame to which the fragment corresponds.

3. The circuit of claim 2, wherein when a new fragment is received that corresponds to a pixel for which a cached fragment is already stored in the current fragment cache, the new fragment is blended with the cached fragment to produce a blended fragment that replaces the cached fragment in the current fragment cache (blend colors if Zs equal, replace color and Z if new Z is closer, don't change color and Z if new Z is further).

4. The circuit of claim 3, wherein the control block provides a displaced fragment stored in the current fragment cache to the render backend block when a line within the current fragment cache that stores the displaced fragment is required to accept a newly received fragment that is not within an addressing range of the displaced fragment.

5. The circuit of claim 4, wherein the first and second fragment caches are direct mapped caches, wherein each of the first and second fragment caches include a plurality of lines.

6. The circuit of claim 5, wherein each line of each of the first and second fragment caches stores a plurality of pixel fragments, wherein a first portion of the set of coordinates select a particular fragment location along each line, wherein a second portion of the set of coordinates select a particular line of the plurality of lines, wherein a third portion of the set of coordinates is stored for each line as a tag value for the line.

7. The circuit of claim 6, wherein the newly received fragment is not within the addressing range of the displaced fragment when the third portion of the set of coordinates for the newly received fragment does not match the third portion of the set of coordinates for the displaced fragment, wherein the second portion of the sets of coordinates for the newly received fragment and the displaced fragment are the same.

8. The circuit of claim 7, wherein each cache line includes a plurality of valid bits, wherein each bit in the plurality of valid bits for a line corresponds to a fragment location along the line, wherein a particular valid bit is set when a fragment is stored at fragment location corresponding to the particular valid bit, (discuss set vs. cleared going either way).

9. The circuit of claim 8, wherein when the fragment stored at the fragment location corresponding to the particular valid bit is flushed from the cache, the valid bit is cleared.

10. The circuit of claim 1, where the state variables stored in the first and second sets of state registers include an alpha blending state variable.

11. The circuit of claim 1, wherein the control block exchanges designations of the first and second fragment caches and first and second sets of state registers such that the current fragment cache is flushed based on a timeout condition.

12. The circuit of claim 1, wherein the control block exchanges designations of the first and second fragment caches and first and second sets of state registers such that the current fragment cache is flushed based on a flush command.

13. The circuit of claim 1, wherein each fragment is an oversampled fragment that includes a sample color value, a sample Z value, and a mask that indicates sample coverage of the fragment.

14. A dual fragment cache pixel processing circuit, comprising:
    a first fragment cache;
    a first set of state registers, wherein the first set of state registers stores state variables for drawing operations corresponding to fragments stored in the first fragment cache;
    a second fragment cache;
    a second set of state registers, wherein the second set of state registers stores state variables for drawing operations corresponding to fragments stored in the second fragment cache;
    a frame buffer that stores current pixel information for a plurality of pixels in a frame;
    a render backend block operably coupled to the first and second fragment caches and the frame buffer, wherein the render backend block combines fragments received from the first and second fragment caches with portions of the current pixel information retrieved from the frame buffer to produce revised pixel information that is stored in the frame buffer, wherein the render backend block combines the fragments with the current pixel information based on state variables for the fragments received from one of the first and second sets of state registers; and
    a control block operably coupled to the first and second fragment caches and the first and second sets of state registers, wherein the control block initially routes received fragments to the first fragment cache, wherein when a cache collision between a received fragment and a cached fragment occurs in the first fragment cache, the control block causes the first cache to output the cached fragment to the render backend block for a combination operation that utilizes the state variables stored in the first set of state registers, wherein when a state change is detected by the control block, the control block begins routing received fragments to the second fragment cache and flushes the first fragment cache such that fragments in the first cache are provided to the render backend block along with the state variables stored in the first set of state registers for combination operations, wherein new state variables included with the state change is stored in the second set of state registers.

15. The circuit of claim 14, wherein each fragment includes a Z value, a color value, and a set of coordinates that identify a pixel in the plurality of pixels in the frame to which the fragment corresponds.

16. The circuit of claim 15, wherein the first and second fragment caches are direct mapped caches, wherein each of the first and second fragment caches include a plurality of lines.

17. The circuit of claim 16, wherein each line of each of the first and second fragment caches stores a plurality of pixel fragments, wherein a first portion of the set of coordinates for a fragment selects a particular fragment location along each line, wherein a second portion of the set of coordinates selects a particular line of the plurality of lines, wherein a third portion of the set of coordinates is stored for each line as a tag value for the line.

18. The circuit of claim 17, wherein each cache line includes a plurality of valid bits, wherein each bit in the plurality of valid bits for a line corresponds to a fragment location along the line, wherein a particular valid bit is set when a fragment is stored at fragment location corresponding to the particular valid bit (discuss set vs. cleared going either way).

19. The circuit of claim 18, wherein when the fragment stored at the fragment location corresponding to the particular valid bit is flushed from the cache, the valid bit is cleared.

20. The circuit of claim 14, wherein each fragment is an oversampled fragment that includes a sample color value, a sample Z value, and a mask that indicates sample coverage of the fragment.

21. A method for buffering fragments in a video graphics system, comprising:
    receiving a received pixel fragment that includes a set of pixel coordinates describing a pixel to which the received pixel fragment corresponds;
    determining a cache line in a first fragment cache for the received pixel fragment based on a first portion of the set of pixel coordinates;
    determining if cached pixel fragments are stored in the cache line for the received pixel fragment;
    when no cached pixel fragments are stored in the cache line for the pixel fragment:
        storing the received pixel fragment in the cache line at a selected line location determined from a second portion of the set of pixel coordinates;
        storing a third portion the set of pixel coordinates in a tag corresponding to the cache line for the pixel fragment; and
        setting a valid bit corresponding to the selected line location;
    when one or more cached pixel fragments are stored in the cache line for the pixel fragment:
        determining if a tag corresponding to the one or more cached pixel fragments matches the third portion of the set of pixel coordinates for the received pixel fragment;
        when the tag corresponding to the one or more cached pixel fragments does not match the third portion of the set of pixel coordinates for the received pixel fragment:
            flushing the one or more cached pixel fragments from the cache line;
            storing the received pixel fragment in the cache line at the selected location determine from the second portion of the set of pixel coordinates;
            storing a third portion the set of pixel coordinates in a tag corresponding to the cache line for the pixel fragment; and setting a valid bit corresponding to the selected line location;

when the tag corresponding to the one or more cached pixel fragments matches the third portion of the set of pixel coordinates for the received pixel fragment:

when the valid bit corresponding to the selected line location determined from the second portion of the set of pixel coordinates is set, blending the received pixel fragment with a selected cached pixel fragment stored at the selected line location;

when the valid bit corresponding to the selected line location determined from the second portion of the set of pixel coordinates is not set:

storing the received pixel fragment in the cache line at the selected location determine from the second portion of the set of pixel coordinates; and setting a valid bit corresponding to the selected line location;

receiving new state variables that replace old state variables, wherein state variables control drawing operations using received fragments;

after receiving the new state variables, flushing the first fragment cache such that drawing operations involving pixel fragments cached in the first fragment cache are performed using the old state variables; and caching subsequently received pixel fragments in a second fragment cache.

22. A method for combining received pixel fragments with stored pixel information, comprising:

storing received pixel fragments in a first fragment cache, wherein when storage of a received pixel fragment requires a cached pixel fragment to be flushed from the current fragment cache, providing the cached pixel fragment along with a first set of state values to a render backend block for processing;

when a state change is indicated:

receiving new state values; and flushing the first fragment cache such that pixel fragments in the first fragment cache are provided to the render backend block along with the first set of state values; and storing subsequently received pixel fragments in a second current fragment cache, wherein when storage of a subsequently received pixel fragment requires a subsequently cached pixel fragment to be flushed from the second fragment cache, providing the subsequently cached pixel fragment along with the new state values stored in the second set of state registers to the render backend block for processing.

* * * * *